July 18, 1950 — P. TILFORD — 2,515,617
FRYING PAN HAVING AREAS OF GREATER HEAT SENSITIVITY
Filed Aug. 19, 1948
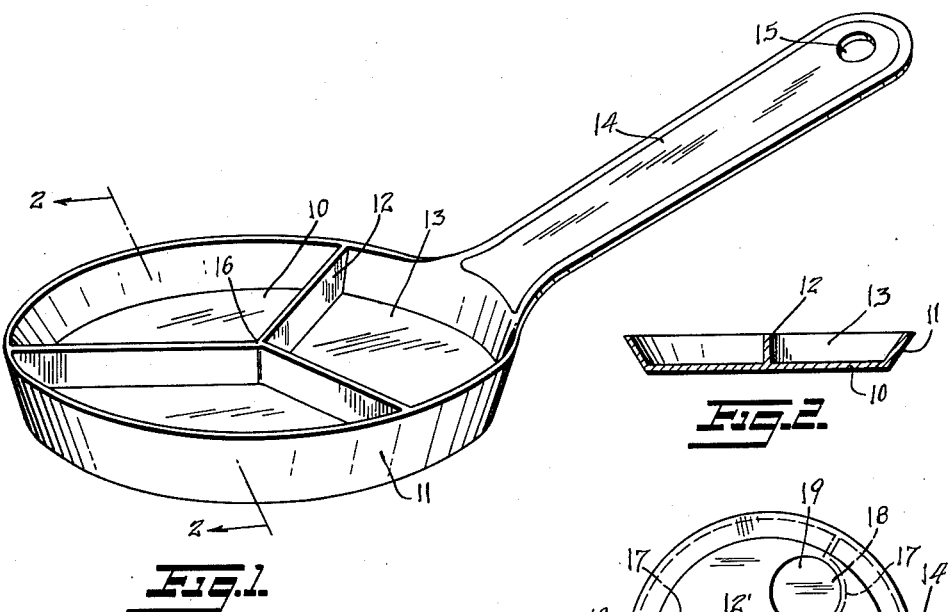
Fig.1.
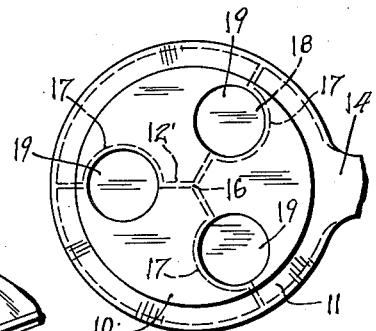
Fig.2.
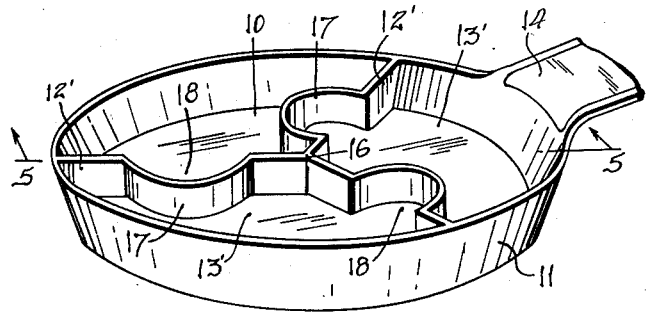
Fig.3.
Fig.4.
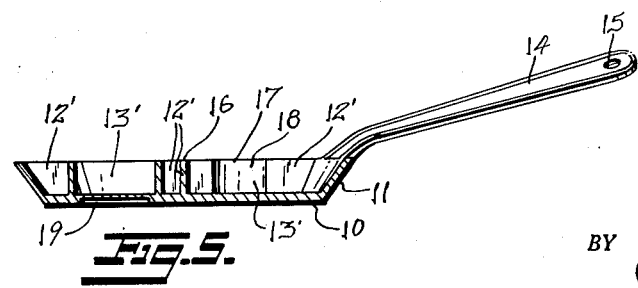
Fig.5.
INVENTOR.
PAULA TILFORD
BY
ATTORNEY

Patented July 18, 1950

2,515,617

UNITED STATES PATENT OFFICE 2,515,617

FRYING PAN HAVING AREAS OF GREATER HEAT SENSITIVITY

Paula Tilford, Newark, N. J.

Application August 19, 1948, Serial No. 45,089

3 Claims. (Cl. 126—390)

This invention relates to frying pans, skillets and the like.

It is an object of the present invention to provide a frying pan with divisional partitions so as to provide three or more compartments for frying or heating various foods at the same time.

It is another object of the present invention to provide a divisional frying pan with compartments for frying different foods wherein a portion of the compartment can be heated to a greater degree to cook the less cooked foods faster than the body of the food.

Other objects of the present invention are to provide a divisional frying pan which is of simple construction, inexpensive to manufacture and efficient in operation.

According to the invention the frying pan is divided into compartments by internal partitions extending between the periphery of the pan and a center location whereby to provide a plurality of compartments for different foods. The foods in the different compartments will thus be kept separated from one another while being heated. In a modified form of the invention, the divisional partitions have curved portions into which portions of the food of a given compartment can be extended. The bottom of the frying pan is recessed under each curved portion of the partitions so that a higher degree of heat can be given to the food in this area whereby portions of the food which have not already been thoroughly cooked can be moved into the curved portions and cooked quickly without having to remove the other food or change the location of the frying pan on the stove.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of the frying pan embodying the features of the present invention.

Fig. 2 is a transverse cross sectional view taken on line 2—2 of Fig. 1.

Fig. 3 is a partial perspective view of the frying pan constructed in accordance with a modification of the present invention.

Fig. 4 is a bottom plan view of the frying pan shown in Fig. 3.

Fig. 5 is a transverse cross sectional view taken on line 5—5 of Fig. 3.

The frying pan, in accordance with the first form of the invention shown in Figs. 1 and 2, includes a bottom 10 integrally formed with a peripheral flange 11 and radially extending partitions 12. The partitions 12 divide the interior of the pan into compartments 13 into which different foods can be placed and cooked when the bottom 10 of the frying pan is rested upon a stove. The bottom 10 is flat and will rest flush on the top of the stove. The partitions 12 are joined at the center as indicated at 16 so as to close the inner ends of the compartments 13.

A long handle 14 is integrally formed with the top edge of the peripheral flange 11 and extends radially from one side of the pan. The outer end of the handle is formed with a hole 15 by which the frying pan may be conveniently hung on a suitable hook. On the drawing, the handle 14 is illustrated extending upward at an angle from the side of the frying pan, but it is pointed out that this is by way of illustration only, as the handle could be extended from the side of the frying pan in a plane parallel to the plane of the flat bottom 10 of the frying pan.

In the modified form of the frying pan illustrated in Figs. 3 to 5 the partitions 12' are formed intermediate of their ends with arcuate portions 17 forming pockets 18 at the sides of the compartments 13' into which portions of the food in each of the compartments may be placed for quicker cooking.

To facilitate the quicker cooking, the bottom 10 of the frying pan is formed with a plurality of circular recesses 19, there being one circular recess 19 beneath each of the arcuate portions 17 of the partitions 12'. From Fig. 4 it will be noted that each of the circular recesses 19 is concentrically formed with respect to each of the arcuate portions 17, so that the exact location of the circular recesses 19 can be determined from the top of the frying pan without looking at the bottom thereof.

The circular recesses 19 in the bottom face of the bottom wall 10 of the frying pan reduces the thickness of the bottom wall in the vicinity of the arcuate portions 17 and permits those areas of the pan to heat up more quickly and transmit heat more readily than the remaining portions of the bottom wall, and this has been found advantageous in preparing certain foods which must be placed in the pan at once and wherein it is desired to cook portions of such foods more thoroughly than other portions. For instance in frying eggs, some people prefer the yellows fried somewhat stiffer than is possible by merely placing the egg on the conventional frying pan, wherein the white becomes very stiff before the desired stiffness of the yellow is obtained. In the present frying pan, the recessed portions of the bottom wall 10 will become hotter than the other portions of the pan and when the egg is dropped into the compartment 13' it is merely necessary to carefully push the yellow into the arcuate portion 17 of the adjacent partition 12', which will automatically position the yellow of the egg over one of the recesses 19 to be subjected to the greater heat of that recess area of the bottom wall 10 so that by the time the white has reached the desired stiffness the yellow will also have attained the desired stiffness without overcooking the white.

In other respects this form of the invention is similar to the first form and like reference numerals identify like parts in each of the several views.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A frying pan comprising a bottom with an upstanding peripheral flange thereon, radially extending partitions connected with the flange and connected together at a central location on the bottom thereof whereby to provide compartments into which different foods can be placed and kept separated from one another, said radially extending partitions being curved intermediate their length to provide a space communicating with each compartment into which a portion of the food in a compartment can be extended, the bottom of the pan being recessed beneath the space provided by the curved portion of the radially extending partitions to thereby reduce the thickness of said bottom.

2. A frying pan comprising a bottom with an upstanding flange thereon, partitions extending radially over the bottom from the flange and dividing the interior of the pan into compartments, said partitions being deformed intermediate of their ends providing areas which extend laterally of the main part of the compartments into which food may be placed for preferred heating, and said bottom being recessed beneath said areas to thereby reduce the thickness of the bottom.

3. A frying pan comprising a bottom wall with an upstanding flange thereon, radially extending partitions formed within said flange dividing the bottom into separate compartments, and arcuate portions formed in each of said partitions intermediate of their lengths, said bottom wall having its bottom face formed with a circular recess for each of said arcuate portions to thereby reduce the thickness of said bottom, said circular recesses being arranged concentric with the arc of said arcuate portions, whereby the location of the recesses can be determined from the top of the pan.

PAULA TILFORD.

REFERENCES CITED

The following references are of record in the file of this patent:

UNITED STATES PATENTS

| Number | Name | Date |
|---|---|---|
| 867,086 | Sullivan | Sept. 24, 1907 |
| 1,522,329 | Salucci | Jan. 6, 1925 |

FOREIGN PATENTS

| Number | Country | Date |
|---|---|---|
| 38,796 | Norway | Jan. 21, 1924 |
| 453,219 | Great Britain | June 5, 1935 |